United States Patent Office 2,907,778
Patented Oct. 6, 1959

2,907,778

ESTERS OF POLYHYDRIC PHENOL AMIDES

Sylvan O. Greenlee, Racine, Wis., assignor to
S. C. Johnson & Son, Inc., Racine, Wis.

No Drawing. Application November 7, 1956
Serial No. 620,811

9 Claims. (Cl. 260—404.5)

This invention relates to a new class of synthetic esters prepared from an unsaturated aliphatic acid and a polyhydric phenol. More particularly, this invention relates to a novel synthetic polyester prepared by esterifying with a long-chain unsaturated acid the phenolic hydroxyl groups of a polyhydric phenol which is the amide prepared from a polyamine and aryloxy-substituted acid. This application is a continuation-in-part of copending application Serial No. 505,553, filed May 2, 1955.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention embraces the production of the esters of such acids and polyhydric phenols. By esterifying the hydroxyl groups of the phenols with converting or plasticizing acids, products having a wide variety of properties may be obtained. Products of this type dissolved in an organic solvent form coating compositions which, on air drying, polymerize through the unsaturated groups to form flexible tack-free films.

The present compositions provide a chemical union in each molecule of one or more plasticizing or converting groups together with a resinous group which has been tailored to suit a particular need. The resinous group herein contemplated is a compound such as that disclosed in the copending United States Greenlee application S.N. 608,171, filed September 5, 1956, entitled "Polyhydric Phenols from Amines." These materials, having controlled molecular weights, hydroxyl content, softening points and solubility characteristics, are the amides derived from a polyamine and an aryloxy-substituted pentanoic acid such as 4,4-bis(4-hydroxyphenyl)-pentanoic acid. The compositions of this invention may be illustrated by the reaction of 10-undecenoic acid with the polyhydric phenol obtained by reacting 2 mols of 4,4-bis-(4-hydroxyphenyl)-pentanoic acid with ethylene diamine.

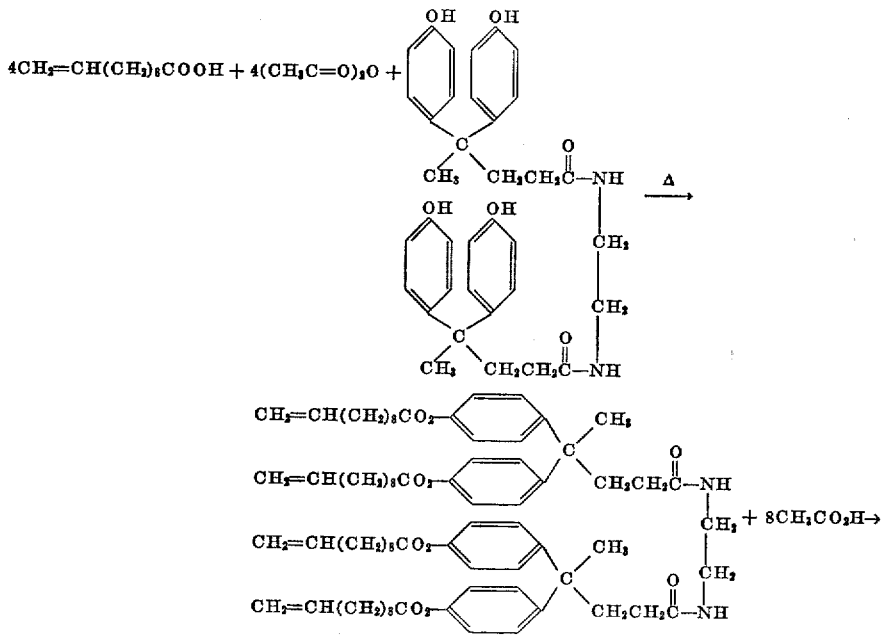

The aryloxy-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300 filed, October 25, 1954, and February 18, 1955, respectively, disclose a number of illustrative compounds suitable for use as the aryloxy-substituted acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated. For example, the nuclei may be alkylated with alkyl groups of from 1 to 5 carbon atoms as disclosed in my copending application Serial No. 489,300 or they may be halogenated. The Diphenolic Acid derived from substituted phenols, such as the alkylated phenols, are sometimes more desirable than the products obtained from the unsubstituted phenols since the alkyl groups impart better organic solvent solubility, flexibility and water resistance. However, the unsubstituted product is usually more readily purified.

A large number of polyamines are suitable for use in preparing the subject polyhydric phenols. They may be aliphatic, aromatic, substituted with other functional groups, or unsubstituted. It is necessary that the amines used to contain at least two primary or secondary amine groups. The substituted materials contemplated are those which do not contain functional groups which would tend to interfere with the reactions of the Diphenolic Acid through its carboxyl group. For example, polyamines containing a carboxy group, such as diamino benzoic acid, would be unsuited since the amidification of the Diphenolic Acid would be competing with the amidification of the benzoic acid carboxyl group. Amino ethers or hydroxamines are examples of suitable substituted compounds. The aliphatic polyamines may be either low molecular weight or high molecular weight compounds. Illustrative low molecular weight polyamines are ethylenediamine, trimethylenediamine, propylenediamine 1,2, tetramethylenediamine, hexamethylenediamine, diethylenetriamine, and triethylenetetramine. These amines are conveniently prepared by the reaction of ammonia with the alkyl halides or by reacting glycols with ammonia in the presence of a contact catalyst, the primary, secondary, and tertiary amines being conveniently separated by boiling point differences or by extraction. These low molecular weight aliphatic polyamines are usually obtained commercially as aqueous solutions and are conveniently used in this reaction as such, thus eliminating the necessity of stripping off water before use. The high molecular weight polyamines are usually prepared from polymerized fatty acids such as capric, undecanoic, lauric, myristic, palmitic, stearic, oleic, linoleic, linolenic, etc. This can be accomplished by the reaction of ammonia with the polymerized fatty acid through a liquid- or vapor-phase process to form the nitrile, such nitriles are then hydrogenated to form the amine. This process usually results in a mixture of primary and secondary amines which are rather difficult to separate; therefore, the preferred method is the reaction of the acid with ammonia to form the amide and subsequent degradation to the amine by the Hoffman reaction. Usually high yields of the primary amine are realized. The most important of the high molecular weight polyamines are probably those derived from the dimer acids of long-chain fatty acids such as soya bean and linseed oil fatty acids but polyamines from the higher molecular weight glycols are also a practical source.

Operable aromatic polyamines are the mononuclear, non-fused polynuclear and fused polynuclear polyamines. Many of the first two types may be described as phenylenepolyamines, wherein two of the aromatic hydrogens are replaced by amino groups or organic radicals containing the same. Illustrative compounds are p-phenylene diamine, aminobenzyl phenyleneamine, tri-(p-aminophenyl)methane, and diamino dipheylamine. Other non-fused compounds include those having more than two of the aromatic hydrogens replaced by amino groups or other radicals, e.g. toluene-2,4-diamine, 3,3'-bitolylene-4,4'-diamine. The characteristics of the final polyhydric phenols of this invention can be varied to a large extent by the selection of the polyamine to be used. For example, if a long-chain polyamine is used, the resultant product is more flexible than if a short-chain or aromatic polyamine was used. The number of amino groups present should be limited to about four, since more than this number would probably result in highly complex products, thereby having poor solvent solubility.

Amidification of the polyamines with Diphenolic Acid is conveniently carried out by direct heating at temperatures of from 175–275° C. under conditions such that water produced during condensation is continuously removed as it is formed. Since the Diphenolic Acid has boiling points higher than the amidification temperature range used, and since the amines are polyfunctional and form salts immediately on contact with the Diphenolic Acid, no difficulty is encountered in carrying out the reaction in the temperature range of 175–275° C. even with the lower boiling amines, such as ethylene diamine. By this process, the polyamine is slowly added with agitation to molten diphenolic acid. Alternatively it may be convenient to carry out the reaction in the presence of water, initially forming an amine salt. The aqueous slurry is gradually heated to reflux and water removed until the above optimum reaction temperature is reached. The water formed during amidification may be removed by merely permitting it to volatilize, or removal may be facilitated by continuously bubbling through the reaction mixture during amidification a stream of inert gas, such as carbon dioxide or nitrogen. It is also sometimes convenient to facilitate the water removal by carrying out the reaction in a vessel provided with condenser attached thereto through a water trap, adding a sufficient amount of a volatile, water-insoluble solvent to give reflux at the amidification temperature, continually removing the water by azeotropic distillation, permitting the solvent to return to the reaction mixture after having dropped the water in the water trap.

A brief study of the prior art will show the above-described amides to be unique. Heretofore, very few polyhydric phenols have been available wherein each hydroxyl group is attached to a different nucleus. Examples of such materials are bisphenol [bis(4-hydroxyphenyl)isopropylidene] and the phenol-aldehyde condensation products. According to the teachings of the present invention, the preparation of a great variety of polyhydric phenols is possible merely by varying the polyamine employed for amidification.

The following examples list the amine values, acid values, and softening points of a number of polyhydric phenols prepared by heating mixtures of polyamines with 4,4-bis(4-hydroxyphenyl)-pentanoic acid under conditions such that water formed during amidification was removed by distillation. A more complete description of the preparation of the subject polyhydric phenols is given in the aforementioned Greenlee application S.N. 608,171. Softening points as used herein were run by the Durrans' Mercury Method (Journal of Oil and Colour Chemists' Association, 12, 173–175 [1929]). Acid values as used herein are defined as the number of milligrams of potassium hydroxide equivalent to the free acid contained in a one-gram sample. Amine values as used herein are defined as the number of milligrams of potassium hydroxide equivalent to the free amine contained in a one-gram sample. These values were determined by electrometric titrations.

| Example Number | Mols of Polyamine Used per Mol 4,4-Bis(4-hydroxyphenyl)-pentanoic acid | Amine Value | Acid Value | Softening Point, ° C. |
|---|---|---|---|---|
| I | 0.5 ethylene diamine | 1.8 | 14 | 110 |
| II | 0.5 propylene diamine-1,2 | 42.0 | 0 | 115 |
| III | 0.5 diethylene triamine | 71.0 | 31 | 128 |
| IV | 0.5 triethylene tetramine | 96.0 | 0 | 117 |
| V | 0.5 hexamethylene diamine | 10.5 | 0 | 83 |
| VI | 0.5 p-phenylene diamine | 7.2 | 19.4 | 91 |
| VII | 0.5 methylene di-aniline | 2.3 | 19.1 | 164 |

The long-chain acids which are contemplated for use in preparing the synthetic esters of this invention include the mono-unsaturated acids of at least about 10 carbon atoms. Illustrative of such acids are the drying oil fatty acids which normally contain from 18 to 22 carbon atoms such as acids obtained by the saponification of naturally-occurring, unsaturated vegetable oils including Chinawood oil, oiticica oil, linseed oil, soyabean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by other synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Low molecular weight unsaturated acids may also be used if only air-drying characteristics are desired, but those containing less than about 10 carbon atoms contribute little plasticization. An example of one of the lower plasticizing acids contemplated is un-decenoic acid, a commercially available material, produced by the decomposition product of castor oil acids.

Esterification of the hydroxyl groups of the polyhydric phenols is carried out by treating the same with the chloride of the desired long-chain acid, liberating HCl as the ester is formed. Alternatively, the esterification may be accomplished by heating the phenol with the desired acid in the presence of acetic anhydride, the amount of the latter being about 10% in excess of the molar proportion of acid used. Heating at temperatures of about 190° to 260° C. will remove, by distillation, unreacted acetic anhydride as well as acetic acid formed in the process.

In the preparation of the subject esters it is to be appreciated that there may be some free amine groups in the final composition, and also that it may be desirable to esterify only a part of the phenolic hydroxy groups of the parent amide with the unsaturated aliphatic monocarboxylic acids, thereby obtaining a composition having free phenolic hydroxyl groups as well as unsaturation. A minimum molar ratio of unsaturated aliphatic acid to DPA polyamide is 1:1 in order for the acid to exert a significant effect upon the properties of the end product.

The following examples illustrate the long-chain unsaturated acid-polyhydric phenol esters of this invention. These embodiments are not intended to limit the invention, and should not be so construed. Quantities of materials expressed are parts by weight unless otherwise indicated.

Example VIII

A mixture of 89 parts of the polyhydric phenol from Example I and 143 parts of linseed oil acids esterified to an acid value of 7 gave a viscosity of H(Gardner bubble viscosimeter) when dissolved in heavy naphtha (boiling range 145–225° C. and having an aniline point of 60° C.), to a 40% nonvolatile content. This product, treated with .03% cobalt drier (based on nonvolatile content) and spread on glass panels with .002" film thickness applicator gave a tack-free film on air-drying. Hard flexible films are also obtained by baking for 30 minutes at 150° C. The baked film was unaffected after 3¼ hours in boiling water and also after 3 hours in 5% aqueous sodium hydroxide at room temperature.

Example IX

A mixture of 91.5 parts of the polyhydric phenol of Example II and 143 parts of dehydrated castor oil acids was esterified to an acid value of 0 to give a product which had a viscosity of A–2 at 40% nonvolatile content in heavy naphtha. This product when treated with .03% cobalt drier (based on nonvolatile content) and spread in .002" wet film thickness was tack-free on air-drying. Hard flexible films were also obtained by baking at 150° C. for 30 minutes. The air-dried film was unaffected after 1 hour in boiling water. The baked film was unaffected after 3½ hours' exposure in boiling water.

Example X

A mixture of 65 parts of the polyhydric phenol obtained from Example V, 38 parts of rosin, and 64 parts of dehydrated castor oil acids, esterified to a product having an acid value of 10, had a viscosity of C at 40% nonvolatile in heavy naphtha. This product when treated with .03% cobalt drier (based on nonvolatile content) on baking for ½ hour at 150° C. gave a hard flexible film which was unaffected by 3¼ hours' exposure to boiling water or by 24 hours' exposure to 5% sodium hydroxide at room temperature.

Example XI

A mixture of 100 parts of the polyhydric phenol from Example VII and 139 parts of 10-undecenoic acid was esterified to an acid value of 18 to give a product which had a viscosity of B when dissolved to 40% nonvolatile in Cellosolve. After adding .03% cobalt drier (based on nonvolatile content), the product when spread in .002" wet film thickness and baked for 30 minutes at 150° C. formed a hard, tack-free film.

It is to be understood that the above examples are intended to be illustrative only. They should not be construed as limiting the scope of the present invention since embodiments other than those specifically disclosed may be produced without departing from invention concept taught. It is desired, therefore, that only such limitations be imposed on the appended claims as are stated therein or required by the prior art.

It is claimed and desired to secure by Letters Patent:

1. A new composition of matter comprising an ester of at least one ethylenically unsaturated aliphatic monocarboxylic acid containing at least about 10 carbon atoms and a polyhydric phenol, said polyhydric phenol being a polyamide of (1) a polyamine containing at least 2 amino groups, each of said amino groups having at least one hydrogen atom attached thereto reactive with a carboxyl group and free from substituents other than ether and hydroxyl and (2) a pentanoic acid consisting essentially of 4,4-bis(4-hydroxyaryl)pentanoic acid wherein the hydroxyaryl radical is a hydroxyphenol radical and is free from substituents other than alkyl groups of from 1–5 carbon atoms.

2. The composition of claim 1 wherein said pentanoic acid consists essentially of 4,4-bis(4-hydroxyaryl)pentanoic acid wherein the hydroxyaryl radical is a hydroxyphenyl radical and is free from substituents other than alkyl groups of one carbon atom.

3. The composition of claim 1 wherein the pentanoic acid is 4,4-bis(4-hydroxyphenyl)pentanoic acid.

4. The composition of claim 3 wherein the unsaturated acid is linseed oil fatty acid.

5. The composition of claim 3 wherein the unsaturated acid is a dehydrated castor oil acid.

6. The composition of claim 3 wherein the unsaturated acid is 10-undecenoic.

7. The composition of claim 3 wherein the polyamine is a saturated aliphatic polyamine.

8. The composition of claim 3 wherein the polyamine is an organic polyamine.

9. A method of preparing a new composition of matter which comprises heating to a temperature of from 190–260° C. in the presence of acetic anhydride substantial proportions of at least one ethylenically unsaturated aliphatic monocarboxylic acid containing at least about 10 carbon atoms and a polyhydric phenol, said polyhydric phenol being a polyamide of (1) a polyamine containing at least 2 amino groups, each of said amino groups having at least one hydrogen atom attached thereto reactive with a carboxyl group and free from substituents other than ether and hydroxyl and (2) a pentanoic acid consisting essentially of 4,4-bis(4-hydroxyaryl) pentanoic acid wherein said hydroxyaryl radical is a hydroxyphenyl radical and is free from substituents other than alkyl groups of from 1–5 carbon atoms.

References Cited in the file of this patent

Bader et al.: J. Am. Chem. Soc. 76, 4465–6 (1954).

UNITED STATES PATENT OFFICE

CERTIFICATE OF CORRECTION

Patent No. 2,907,778                                    October 6, 1959

Sylvan O. Greenlee

It is hereby certified that error appears in the printed specification of the above numbered patent requiring correction and that the said Letters Patent should read as corrected below.

Column 3, line 9, after "used" strike out "to"; line 14, for "carboxy" read -- carboxyl --; line 18, for "hydroxamines" read -- hydroxyamines --; line 59, for "dipheylamine" read -- diphenylamine --; column 4, line 11, for "diphenolic acid" read -- Diphenolic Acid --; column 5, line 11, for "Low" read -- Lower --; column 6, line 38, for "hydroxyphenol" read -- hydroxyphenyl --.

Signed and sealed this 17th day of May 1960.

(SEAL)
Attest:

KARL H. AXLINE                                             ROBERT C. WATSON

Attesting Officer                                          Commissioner of Patents